United States Patent Office 2,697,329
Patented Dec. 21, 1954

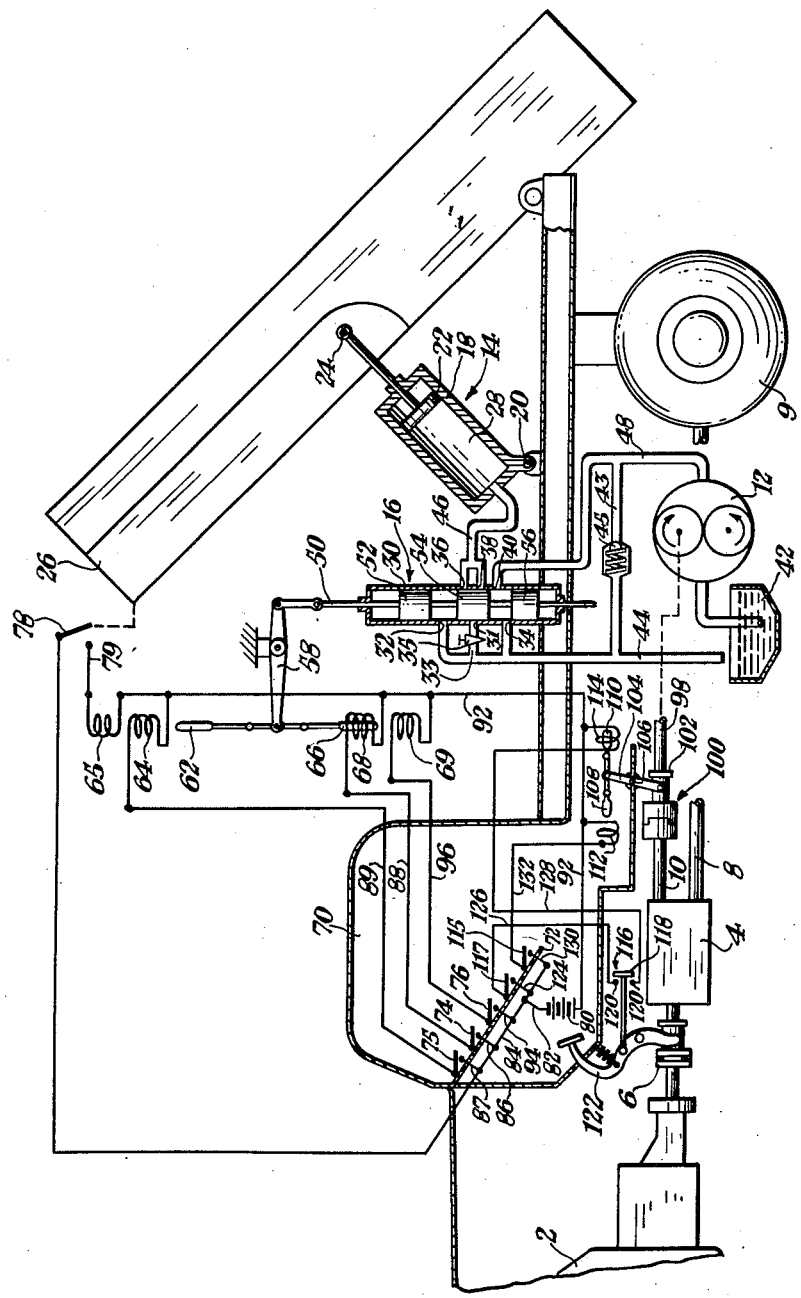

2,697,329

CONTROL SYSTEM FOR HYDRAULIC TRUCK LIFTS

Joseph V. Eichler, Arona, Pa.

Application May 4, 1951, Serial No. 224,571

8 Claims. (Cl. 60—52)

This invention relates to control systems and more particularly to control systems for fluid pressure operated hoists and the like mounted upon motor vehicles. A principal object of this invention is the provision of new and improved systems of this type.

It has long been the practice to control the operation of a fluid pressure or hydraulic motor mounted on a vehicle for actuating a hoist or the like through a valve which controls the ingress and egress of fluid under pressure to and from the pressure motor. In truck installations, the valve has been actuated by manually operable control members mechanically connected thereto. These control members have been unwieldy, difficult to install and, when located within the truck cab, have taken up valuable space. Furthermore, when the valve has been located near the truck cab and control members disposed therein, extensive piping arrangements have been necessary for conveying the motor fluid to and from the fluid pressure motor. When the valve has been located remote from the truck cab, cumbersome complicated mechanical linkages have been required. In tractor-trailer applications where the fluid pressure motor is carried on the trailer, this is particularly undesirable. It is an object of this invention to provide a control for a hydraulic system which will not be subject to these disadvantages and which will permit the valve to be located adjacent or proximate the pressure motor.

Another object of this invention is to provide an electric control system for a vehicle mounted hydraulic hoist.

Another object of this invention is to provide for the control of a vehicle mounted fluid pressure operated motor by means of simple switching devices located remote from the motor.

Another object of this invention is to provide means for automatically controlling the operation of a fluid pressure operated motor.

Another object of this invention is to provide a source of fluid pressure for a motor vehicle hydraulic system which may be controlled at the will of the operator.

Another object of this invention is to provide means for connecting a mechanism to be driven to the transmission of a motor vehicle, which means is ineffective to establish a connection while the transmission is receiving power from the vehicle engine.

Other objects and advantages will appear from the following specification taken in connection with the accompanying drawing which is a schematic showing of a control system for a truck dumping apparatus embodying this invention.

Referring to the drawing, the control system of this invention is here shown as applied to a truck having a suitable prime mover or engine 2 connected to a conventional transmission 4 through the usual friction clutch 6. The transmission 4 may be of any suitable form and is provided with the usual power output shaft 8 adapted for connection with the driving wheels 9 of the vehicle and a power take off shaft 10 which supplies power to a pump 12. The pump 12 is arranged to supply fluid under pressure to a fluid pressure actuated motor 14 under the control of a valve 16.

The fluid pressure actuated motor 14 may be of any suitable form and is here shown as comprising a cylinder 18 pivoted at 20 on the chassis of the truck and having a piston 22 slidably mounted therein. The piston 22 is adapted to apply forces to the load carried by the vehicle and is here shown as pivotally connected at 24 to a conventional dump body 26. The flow of fluid under pressure to and from the space 28 beneath the piston 22 is controlled by the valve 16 as will more fully appear.

The valve 16 is here shown as comprising a generally cylindrical casing 30 provided with a plurality of axially spaced apertures 31, 32, 34, 36, 38 and 40. The apertures 32, 34 communicate with a sump tank 42 through a suitable conduit 44; the aperture 31 communicates with the conduit 44 through a pipe 33 in which is disposed a flow restricting device here shown as a throttling valve 35; the apertures 36, 38 communicate with the space 28 beneath the piston 22 of the fluid pressure actuated motor device 14 through a suitable conduit 46; and the aperture 40 communicates with the outlet of the pump 12 through a suitable conduit 48. The conduit 48 may be connected to the conduit 44 by a by pass conduit 43 having a suitable relief valve 45 disposed therein in a manner well known in the art.

Slidably carried in the casing 30 of the valve 16 is an axially extending shaft 50 which carries thereon three axially spaced piston valve elements 52, 54, 56. The shaft 50 and its associated piston elements are axially movable between controlling positions by means to be more fully described. The apertures 32—40 are so positioned in the casing 30 that when the piston elements 52, 54, 56 are in a first or neutral position, as shown in the drawing, the aperture 32 communicates with the space between the piston elements 52, 54, the apertures 34, 40 communicate with the space between the piston elements 54, 56, and communication between the apertures 31, 36, 38 and the interior of the casing 30 is prevented by the piston element 54. The apertures 31—40 are also so arranged relative to the piston elements 52—56 that when the shaft 50 is moved upward as viewed in the drawing to a second position, the piston element 54 will close the aperture 32 and open the aperture 38 while the piston element 56 will close the aperture 34. The relation between the piston elements 52—56 and the apertures 31—40 is also such that when the shaft 50 is moved downward as viewed in the drawing to a third position, the piston element 54 will open the aperture 36 while retaining the aperture 38 closed. Furthermore, downward movement of the shaft 50 to a fourth position below said third position will close the aperture 32 and establish communication between apertures 31—36.

It will be apparent that when the piston elements 52—56 are in the first or neutral position as shown in the drawing, fluid under pressure will flow from the outlet of the pump 12 through the conduit 48, aperture 40, space between piston elements 54, 56, aperture 34 and conduit 44 to the sump tank 42. When the piston elements are moved upward to the second position, communication between the interior of the casing 30 and the sump tank 42 will be cut off and communication will be established between the pump 12 and the space 28 below the piston 22 of the fluid pressure motor 14. Thus, fluid will flow from the outlet of the pump 12 through the conduit 48, aperture 40, space between the piston elements 54, 56, aperture 38 and conduit 46 to the space 28 where it will be effective to actuate the piston 22.

When the piston elements 52, 54, 56 are moved downward as viewed in the drawing to the third position, communication is established between the space 28 of the fluid pressure motor 14 and the sump tank 42 and fluid will flow from the space 28 through the conduit 46, aperture 36, space between the piston elements 52, 54, aperture 32 and conduit 44 to the sump tank 42 to permit the piston element 22 to return to its initial position. At the same time, the fluid under pressure supplied by the pump 12 is effectively by-passed and flows from the outlet of the pump 12 through the conduit 48, aperture 40, space between piston elements 54, 56, aperture 34, and conduit 44 to the sump tank 42.

When the shaft 50 and its associated piston elements are further moved downward to the aforesaid fourth position, wherein communication is established between the apertures 31 and 36, apertures 32 and 38 are closed while communication is maintained between the apertures 34 and 40. Fluid will therefore flow from the space 28 through the conduit 46, aperture 36, space between piston elements 52, 54, aperture 31, throttling valve 35, conduit 33, and conduit 44 to the sump tank 42. The throttling effect of the valve 35 will reduce the rate at which fluid will drain from the fluid motor 14 so that the piston 22 will return to its initial position more slowly than when drainage is effected through the aperture 32, that is, when the shaft 50 and piston elements 52—56 are in the aforementioned third position.

It is to be understood that the valve 16 disclosed herein is illustrative only and may assume a wide variety of forms which will be apparent to those skilled in the art.

To effect movement of the piston elements 52—56 to the above described positions, electrically operable actuating means is provided. This means may take the form of an armature element 62 secured to one end of a lever 58 and cooperable with a pair of axially aligned solenoid coils 64, 65 each of which is effective when energized to position the armature 62 within itself. The lever 58 also carries an armature element 66 disposed opposite the armature element 62 and cooperable with a pair of aligned solenoid coils 68, 69 each of which when energized is effective to position the armature 66 within itself. The other end of the lever 58 is pivotally connected to the shaft 50 so that rotational movement thereof upon energization of the respective solenoid coils 64, 65, 68, 69 will effect axial movement of the shaft 50.

The vehicle is provided with a driver's station or cab 70 with the usual dashboard 72 disposed therein. Mounted on the dashboard 72 within easy reach of the operator are three manually operable switches 75, 74, 76 which control the energization of the solenoids 64, 68, 69 respectively. Energization of the solenoid 65 may be under the control of a suitable momentary type switch 78 here shown as operatively connected to the dump body 26 to be closed when the body 26 has been lowered through a predetermined position.

In operation, if the piston 22 is to be moved upward, the switch 76 is momentarily closed and the solenoid 69 will be energized through a circuit which may be traced as follows: from one terminal of a suitable source of electric power here shown as a battery 80, wire 82, wire 84, wire 94, switch 76, wire 96, solenoid coil 69, and wire 92 to the other terminal of the battery 80. Energization of the coil 69 will move the lever 58 in a counterclockwise direction to move the piston members 52—56 upward to the aforementioned second position to permit the flow of fluid under pressure into the space 28 as hereinbefore described. It will be apparent that opening of the switch 76 will cause deenergization of the coil 69 but the piston elements 52—56 will remain in the second position and drain on the battery 80 will be terminated.

If the piston 22 is to be lowered rapidly, the switch 75 is momentarily closed to complete an energizing circuit for the solenoid coil 64 which may be traced as follows: from one terminal of the battery 80 to wire 82, wire 84, wire 87, switch 75, wire 89, coil 64 and wire 92 to the other terminal of the battery 80. When the coil 64 is energized, the armature 62 is centered therein to rotate the lever 58 about its pivot and the piston elements 52—56 will be moved downward as viewed in the drawing to the aforesaid third position to permit the space 28 to communicate without restriction with the drain as hereinbefore described and the piston 22 of the fluid pressure motor 14 will move rapidly downward under the load carried thereby. It will be apparent that when the switch 75 is opened, the coil 64 will be deenergized but the piston elements 52—56 will remain in the third position.

To lower the piston 22 slowly, the piston elements 52—54 are positioned in the fourth position and this is effected by energizing the solenoid coil 65. As here shown, energization of the coil 65 is controlled by the switch 78 operatively associated with the piston 22 of the motor 14 through an operative connection with the dump body 26. Such an arrangement makes possible the rapid lowering of a load until the piston 22 nears its lower limit at which time the switch 78 may be closed to energize the solenoid 65 causing the armature 62 to be centered therein thereby rotating the lever 58 about its pivot and moving the piston elements 52—56 to the fourth position wherein fluid flowing from the space 28 beneath the piston 22 is throttled by the valve 35. Thus, the load may be automatically lowered gently to the truck bed and heavy impacts on the truck chassis may be eliminated.

The energizing circuit for the solenoid 65 may be traced as follows: one terminal of the battery 80 to wire 82, wire 84, switch 78, wire 79, coil 65, and wire 92 to the other terminal of the battery 80.

If it is desired to return the piston elements 52—56 to the first or neutral position, the switch 74 is momentarily closed to complete an energizing circuit for the solenoid 68 which may be traced as follows: from one terminal of the battery 80 to wire 82, wire 84, wire 86, switch 74, wire 88, coil 68 and wire 92 to the other terminal of the battery 80. Energization of the solenoid 68 causes the armature 66 to be centered therein (as shown in the drawings) to move the lever 58 about its pivot and position the piston elements 52—56 in the neutral position (as shown in the drawings).

The pump 12, which comprises the source of fluid under pressure for the hydraulic system, is preferably of the positive displacement type and has the power input shaft 98 thereof connected to the power take off shaft 10 of the transmission 4 through a suitable positive clutch 100. The clutch 100 includes a movable element 102 shiftable between clutched and unclutched positions to establish and terminate a torque transmitting relation between the shaft 10 and the shaft 98. Movement of the clutch element 102 between clutched and unclutched positions is effected by a shifting lever 104 pivoted at 106 and having one end thereof connected to the clutch element 102 in any suitable manner. Pivotally connected to the other end of the lever 104 is a pair of armature elements 108, 110 which extend in opposite directions and are respectively cooperable with two solenoid coils 112, 114 which are effective when energized to actuate the shifting lever 104. Energization of the solenoid coils 112, 114 is controlled by two manually operable switches 115, 117 respectively which are mounted on the dashboard 72 within easy reach of the operator.

To preclude accidental engagement of the positive clutch 100 while the transmission 4 is receiving power from the engine 2, means operatively associated with the friction clutch 6 is provided for preventing such engagement while the friction clutch 6 is in a torque transmitting condition. This means may take the form of a switch 116 in the energizing circuit of the solenoid 114. The switch 116 is operatively associated with the friction clutch 6 to be closed only when the friction clutch 6 is disengaged and is here shown as comprising a switch blade 118 movable relative to a pair of contacts 120 and connected to a conventional foot pedal lever 122 for operating the friction clutch 6. As is customary in motor vehicles, a depressing of the foot pedal lever 122 is effective to move the elements of the friction clutch 6 to the unclutched position and in the present device such movement of the lever 122 is effective to close the switch 116 by moving the switch blade 118 into engagement with the contacts 120.

When it is desired to provide a supply of fluid under pressure to operate the pressure actuated motor 14, the clutch operating foot pedal 122 is depressed to disengage the friction clutch 6 from the transmission 4 and close the switch 116. The switch 117 is then manually operated to closed position to complete the energizing circuit for the solenoid coil 114 which may be traced as follows: from one terminal of the battery 80 to wire 82, wire 84, wire 124, switch 117, wire 126, contact 120, switch blade 118 of switch 116, contact 120, wire 128, solenoid 114, and wire 92 to the other terminal of the battery 80. The armature 110 is thus moved to the right to pivot the lever 104 in a clockwise direction and shift the movable clutch element 102 of the postive clutch 100 into its clutched position. Power is then supplied from the power take off shaft 10 of the transmission 4 to the pump 12.

The switch 117 may then be opened and the clutch 100 will remain in torque transmitting condition until the switch 115 is moved to the closed position to energize the coil 112 through an energizing circuit which may be traced as follows: from one terminal of the battery 80 to wire 82, wire 84, wire 130, switch 115, wire 132, solenoid coil 112, and wire 92 to the other terminal of the battery 80. When the solenoid coil 112 is energized, the armature 108 will be moved to the left as viewed in the drawing to pivot the shifting lever 104 in a counter clockwise direction about its pivot 106 and shift the movable clutch element 102 to its unclutched position thereby terminating the supply of power to the pump 12.

It will be apparent to those skilled in the art that the illustrated embodiment of the invention provides a new and improved control system and accomplishes the objects of the invention. On the other hand, it will be obvious to those skilled in the art that the illustrated embodiment may be variously changed and modified, or features thereof, singly or collectively, embodied in other combinations than those illustrated without departing from the spirit of the invention or sacrificing all of the advantages thereof, and that accordingly the disclosures herein are illustrative only and the invention is not limited thereto.

It is claimed and described to secure by Letters Patent:

1. In a motor vehicle having an internal combustion engine with a transmission connected thereto through a friction clutch and fluid pressure actuated motor means operatively connected to movable load supporting means for actuating the same, the combination of pumping means providing a source of fluid under pressure, connection means for transmitting power from the transmission to said pumping means, said connection means including clutch means movable between clutched and unclutched positions, means for controlling the position of said clutch means, means operatively associated with the friction clutch and said last named means for permitting said clutch means to move to said clutched position only while the friction clutch is in unclutched position, valve means movable between positions for controlling the ingress and egress of fluid under pressure to and from the motor means, electrically operable means adapted when energized for moving said valve means between said controlling positions, and manually operable means for controlling the energization of said electrically operable means.

2. In a motor vehicle having an internal combustion engine with a transmission connected thereto through a friction clutch and fluid pressure actuated motor means operatively connected to movable load supporting means for actuating the same, the combination of pumping means providing a source of fluid under pressure, connection means for transmitting power from the transmission to said pumping means, said connection means including clutch means movable between clutched and unclutched positions, electrically operable actuating means adapted when energized for moving said clutch means to said clutched from said unclutched position, means for energizing said actuating means, means for controlling said energizing means, means operatively connected to the friction clutch and said control means for preventing energization of said actuating means while the friction clutch is in torque transmitting condition, valve means movable between positions for controlling the ingress and egress of fluid under pressure to and from the motor means, electrically operable means adapted when energized for moving said valve means between said controlling positions, and manually operable means for controlling the energization of said electrically operable means.

3. In a motor vehicle having an internal combustion engine with a transmission connected thereto through a friction clutch and fluid pressure actuated motor means operatively connected to movable load supporting means for actuating the same, the combination of pumping means providing a source of fluid under pressure, connection means for transmitting power from the transmission to said pumping means, said connection means including clutch means movable between clutched and unclutched positions, electrically operable actuating means adapted when energized for moving said clutch means to said clutched from said unclutched position, an energizing circuit for said actuating means, a switch in said energizing circuit operatively associated with the friction clutch for holding said circuit open while the friction clutch is in torque transmitting condition, valve means movable between positions for controlling the ingress and egress of fluid under pressure to and from the motor means, electrically operable means adapted when energized for moving said valve means between said controlling positions, and manually operable means for controlling the energization of said last named electrically operable means.

4. A control system as claimed in claim 3 wherein said energizing circuit includes a manually operable switch.

5. In a motor vehicle having an internal combustion engine with a transmission connected thereto through a friction clutch and fluid pressure actuated motor means operatively connected to movable load supporting means for actuating the same, the combination of pumping means providing a source of fluid under pressure for the motor means, connection means for transmitting power from the transmission to said pumping means, said connection means including clutch means movable between clutched and unclutched positions, means for controlling the position of said clutch means, and an operative connection between the friction clutch and said last named means for permitting said clutch means to move to said clutched position only while the friction clutch is in non-torque transmitting condition.

6. In a motor vehicle having an internal combustion engine with a transmission connected thereto through a friction clutch and fluid pressure actuated motor means operatively connected to movable load supporting means for actuating the same, the combination of pumping means providing a source of fluid under pressure for the motor means, connection means for transmitting power from the transmission to said pumping means, said connection means including clutch means movable between clutched and unclutched positions, electrically operable actuating means adapted when energized for moving said clutch means to said clutched from said unclutched position, means for controlling energization of said actuating means, and an operative connection between said last named means and the friction clutch for said permitting movement of said clutch means to said clutched position only while the friction clutch is in non-torque transmitting condition.

7. In a motor vehicle having an internal combustion engine with a transmission connected thereto through a friction clutch and fluid pressure actuated motor means operatively connected to movable load supporting means for actuating the same, the combination of pumping means providing a source of fluid under pressure for the motor means, connecting means for transmitting power from the transmission to said pumping means, said connection means including clutch means movable between clutched and unclutched positions, electrically operable actuating means adapted when energized for moving said clutch means to said clutched from unclutched position, an energizing circuit for said actuating means, and a switch in said energizing circuit operatively associated with the friction clutch for holding said circuit open while the friction clutch is in torque transmitting condition.

8. A system as claimed in claim 7 wherein said energizing circuit includes a manually operable switch.

References Cited in the file of this patent

UNITED STATES PATENTS

| Number | Name | Date |
| --- | --- | --- |
| 1,948,951 | Walker | Feb. 27, 1934 |
| 2,087,138 | Brick | July 13, 1937 |
| 2,219,896 | Harrington et al. | Oct. 29, 1940 |
| 2,311,864 | Parsons | Feb. 23, 1943 |
| 2,388,369 | Shendrick | Nov. 6, 1945 |
| 2,397,937 | Hadekel | Apr. 9, 1946 |
| 2,543,210 | Wagstaff | Feb. 27, 1951 |